United States Patent
Wagoner

(10) Patent No.: US 7,643,319 B2
(45) Date of Patent: Jan. 5, 2010

(54) 7-LEVEL WYE-CONNECTED H-BRIDGE CONVERTER TOPOLOGY FOR POWERING A HIGH-SPEED ELECTRIC MOTOR

(75) Inventor: Robert G. Wagoner, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 278 days.

(21) Appl. No.: 11/821,257

(22) Filed: Jun. 22, 2007

(65) Prior Publication Data

US 2008/0316778 A1 Dec. 25, 2008

(51) Int. Cl.
 *H02J 1/10* (2006.01)
(52) U.S. Cl. .......................... 363/65; 363/71
(58) Field of Classification Search ............. 363/34–46, 363/95–98, 131, 132, 57–58, 71; 318/762, 318/800
See application file for complete search history.

(56) References Cited

U.S. PATENT DOCUMENTS 5,805,437 A * 9/1998 Gruning ..................... 363/71
6,115,270 A * 9/2000 Yamane et al. ............... 363/40

* cited by examiner

*Primary Examiner*—Rajnikant B Patel
(74) *Attorney, Agent, or Firm*—Edward J. Smith; Ernest G. Cusick; Frank A. Landgraff

(57) ABSTRACT

A 7-level wye-connected H-bridge converter that provides redundancy for continued operation when one bridge phase has failed and more particularly to a topology that includes multiple semiconductor H-bridges and a three-phase semiconductor mid-bridge. The converter may continue operation with failure of any bridge, as a three-phase, wye-connected H-bridge by bypassing the failed bridge. Individual bridges of the converter may be operated at different dc-bus voltages to maximize power output. The converter may employ synchronous gating signals for the semiconductor devices of the bridges, including a zero-current notch waveform for minimizing harmonic distortion of the output waveform.

20 Claims, 10 Drawing Sheets

US 7,643,319 B2

7-LEVEL WYE-CONNECTED H-BRIDGE CONVERTER TOPOLOGY FOR POWERING A HIGH-SPEED ELECTRIC MOTOR

BACKGROUND OF THE INVENTION

The present invention is related to the following GE application 11/809,122, filed on May 31, 2007, respectively.

The invention relates generally to a new topology for a 7-level wye-connected H-bridge converter that provides redundancy for continued operation when one bridge phase has failed and more particularly to a topology that includes multiple semiconductor H-bridges and a three-phase semiconductor mid-bridge. Individual bridges of the converter may be operated at different dc-bus voltages to maximize power output. The converter may employ synchronous gating signals for the semiconductor devices of the bridges, including a zero-current notch waveform for minimizing harmonic distortion of the output waveform and increasing power output of the converter.

High-speed, high-power electric motors that operate at variable speed are increasingly required in a range of industrial, mining and drilling activities. Further, the activities often require a high-degree of reliability. In operations such as crude oil pumping from remote global locations where access to pumping stations is difficult and time-consuming, reliability of motor operation is necessary to prevent dangerous, costly and extended outages. Simple, sturdy and reliable power converters are requisites for such high-speed, high-power motor operations. It is well known that providing multiple individual components, such as series or parallel semiconductor switches, may increase the likelihood that any one individual component switch may randomly fail. Added elements such as snubber circuits for semiconductor switches, further increases the number of components that can fail. It is desirable to arrange the power converter in a simple configuration, with as low a part component count as is possible. However, individual components such as the semiconductor switches for the power converted must be operated with satisfactory margin to thermal and other functional limits to prevent failures in the simplified configuration.

A simplified three-phase, wye-connected H-bridge converter configuration is illustrated in FIG. 1. Each phase of the converter includes a power source/sink 20 with a dc power shaping circuit, represented by capacitor 30. The power source/sink 20 and dc power shaping circuit, represented by capacitor 30, establish a dc-bus voltage input to the semiconductor switches 40 of the bridge. Insulated-gate bipolar transistor (IGBTs) semiconductor switches 40 with built-in diodes 45 may form each leg of the H-bridges 50, for example, but other power semiconductor switches such as integrated-gate commutated thyristors (IGCTs) or metal-oxide semiconductor field-effect transistors (MOSFETs) could be used instead. The type of power semiconductor switch is not important to the analysis. Each H-bridge includes two legs, an output leg 60 and a neutral leg 65. Each phase output, phase A 70, phase B 75 and phase C 80, is connected to the midpoint 85 of the respective output bridge leg 60. Each neutral connection to wye-point 90 is tied to the midpoint 95 of the respective neutral output leg 65. A gating control 115 providing gating signals 116, 117, 118 for switching the semiconductor devices 40 of the H-bridges 50 may also be provided.

While the above-described three-phase, wye-connected H-bridge converter provides simplicity, should failure occur in one of the phase H-bridges, normal operation of large high-speed electric motors (HSEMs) loads will be interrupted.

BRIEF DESCRIPTION OF THE INVENTION

Accordingly, to assure reliability of operation of the motor loads, it is desirable to provide a converter topology that can survive failure of any one phase of the H-bridge circuit, but at the same time reduce switching losses and harmonic distortion.

Briefly in accordance with one aspect of the present invention, a 7-level wye-connected H-bridge converter is provided. The H-bridge converter includes a plurality of semiconductor H-bridge output phases incorporating semiconductor switches. Each H-bridge output phase incorporates a power source/sink, a dc-bus, an output leg and a connecting leg, a phase output of the converter from a midpoint of each output H-bridge leg, and a connecting output from a midpoint of each connecting semiconductor H-bridge leg. The converter also includes a three-phase semiconductor mid-bridge incorporating semiconductor switches. The mid-bridge includes a power source/sink, a dc-bus, and a phase output at a mid-point of each of a phase A leg, a phase B leg and a phase C leg of the mid-bridge. A connection ties the connecting output of each individual H-bridge leg and a corresponding phase output from the midpoint of the phase A leg, the phase B leg and the phase C leg of the three-phase semiconductor mid-bridge. A gating control may provide switching waveforms for the semiconductor H-bridge and the three-phase semiconductor mid-bridge.

In accordance with a second aspect of the present invention, a method is provided for operating a 7-level wye-connected H-bridge converter. The converter includes a plurality of semiconductor H-bridge output phases with semiconductor switches, each H-bridge output phase with a power source/sink, a dc-bus, an output leg and a connecting leg, a phase output of the converter from a midpoint of each output H-bridge leg and a connecting output from a midpoint of each connecting semiconductor H-bridge leg. The converter also includes a three-phase semiconductor mid-bridge with semiconductor switches incorporating a power source/sink, a dc-bus, and a phase output at a mid-point of each of a phase A leg, a phase B leg and a phase C leg of the mid-bridge; a connection between the connecting output of each H-bridge leg and a corresponding phase output from the midpoint of a phase A leg, a phase B leg and a phase C leg of the three-phase semiconductor mid-bridge. The converter also includes a gating control for the semiconductor H-bridge and the three-phase semiconductor mid-bridge.

The method includes operating with three functioning H-bridges and a functioning mid-bridge as a 7-level line-to-line output from the wye-connected H-bridge, each line-to-line output connected across the midpoint of the phase output and the connecting output of the respective H-bridge phase and between the midpoints of the corresponding phase legs of the mid-bridge output. The method also includes operating with a failed H-bridge as a 5-level output from a three-phase, wye-connected H-bridge; and operating with a failed mid-bridge as a 5-level output from a three-phase, wye-connected H-bridge.

According to another aspect of the present invention, a method is provided for operating, a 7-level wye-connected H-bridge converter with minimum harmonic distortion of output current. The converter includes a plurality of semiconductor H-bridge output phases with semiconductor switches, each H-bridge output phase with a power source/sink, a dc-bus, an output leg and a connecting leg, a phase output of the converter from a midpoint of each output H-bridge leg and a connecting output from a midpoint of each connecting semiconductor H-bridge leg. The converter also includes a three-phase semiconductor mid-bridge with semiconductor switches incorporating a power source/sink, a dc-bus, and a phase output at a mid-point of each of a phase A leg, a phase B leg and a phase C leg of the mid-bridge; a connection between the connecting output of each H-bridge leg and a corresponding phase output from the midpoint of the phase A leg, the phase B leg and the phase C leg of the three-phase semiconductor mid-bridge. The converter also includes a gating control for the semiconductor H-bridge and the three-phase semiconductor mid-bridge.

The method includes gating semiconductor switches of the mid-bridge according to a synchronous switching pattern without notches and gating semiconductor switches of the H-bridge output phases according to a zero current switching pattern with two notches positioned in proximity to the zero-crossing for line current of the converter.

BRIEF DESCRIPTION OF THE DRAWING

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

The following embodiments of the present invention have many advantages, including providing a converter that has redundancy to continue motor operation with failure of an H-Bridge phase or a mid-bridge phase. During normal operation of one embodiment, four semiconductor bridges are in operation, providing a 7-level stepped output voltage, delivering a close simulation of a sinusoidal output voltage to the motor load. With one failed bridge, the remaining functioning bridges operate as a three-phase, wye-connected H-bridge, providing a 5-level stepped output voltage to the motor load. For a designated motor load, the converter may be operated with balanced dc-bus voltage provided to the dc-bus of all bridges. However, the converter may be extended to drive higher speed loads by reducing the voltage to the dc-bus for the mid-bridge, which may include the most thermally limiting semiconductor switches. A synchronous gating source may be provided to drive the bridges. A zero-current notch switching waveform may be also provided by the gating source to improve output current harmonic distortion.

Figure 1:
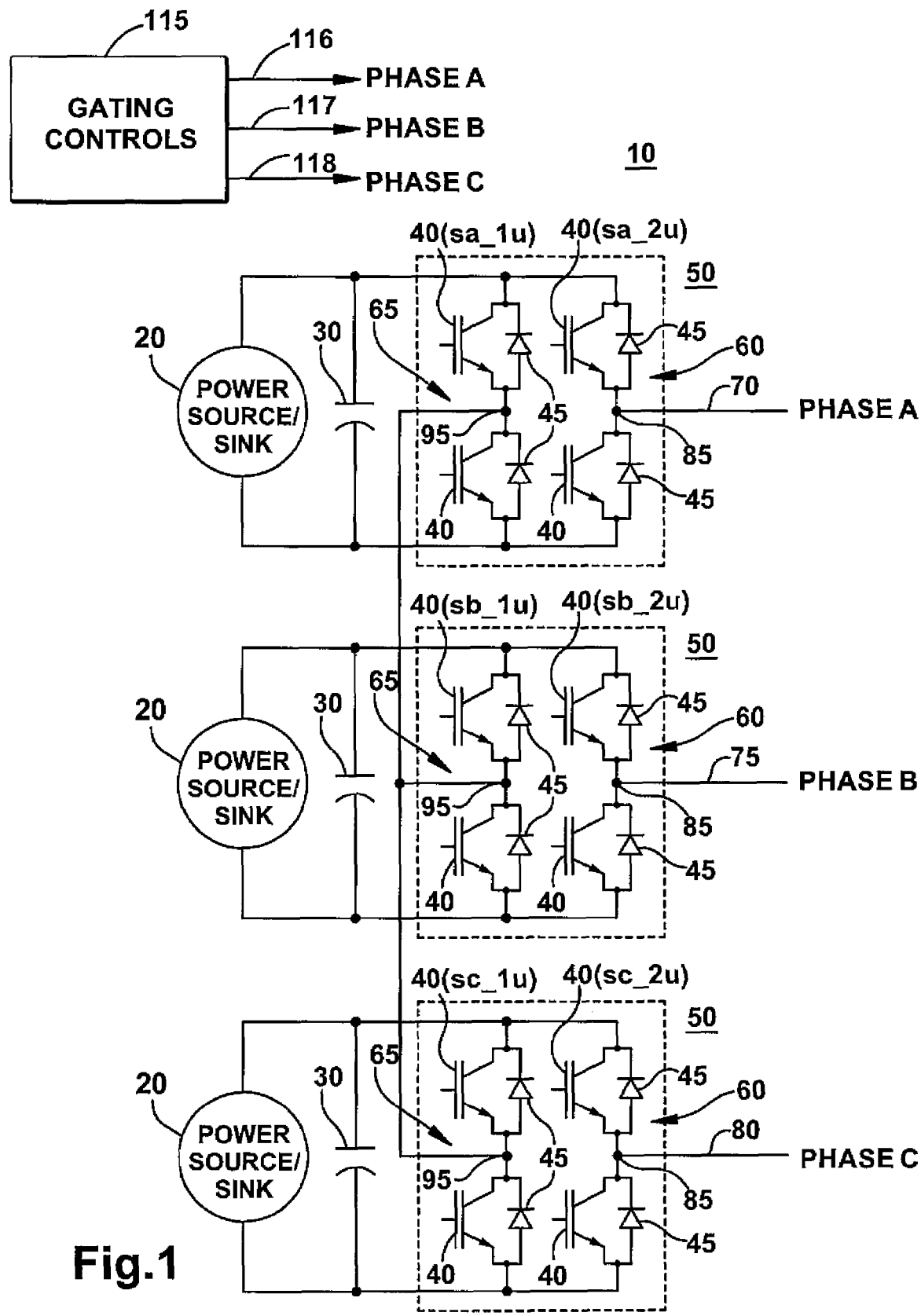
FIG. 1 illustrates a simplified three-phase, wye-connected H-bridge converter configuration of prior art.
Figure 2A:
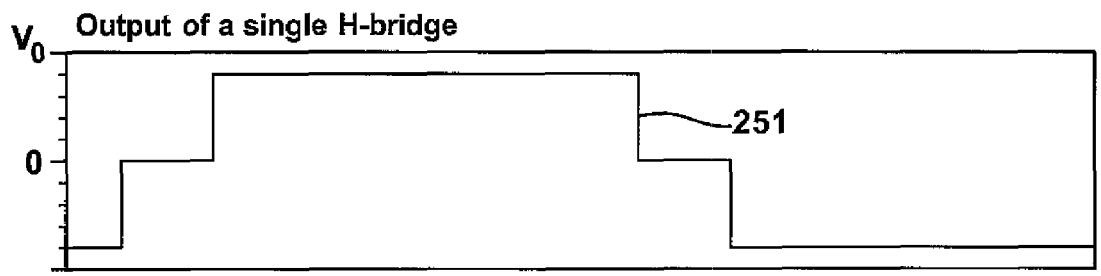
FIG. 2A illustrates stepped line-to-neutral voltage of a single H-bridge between leg midpoints.
Figure 2B:
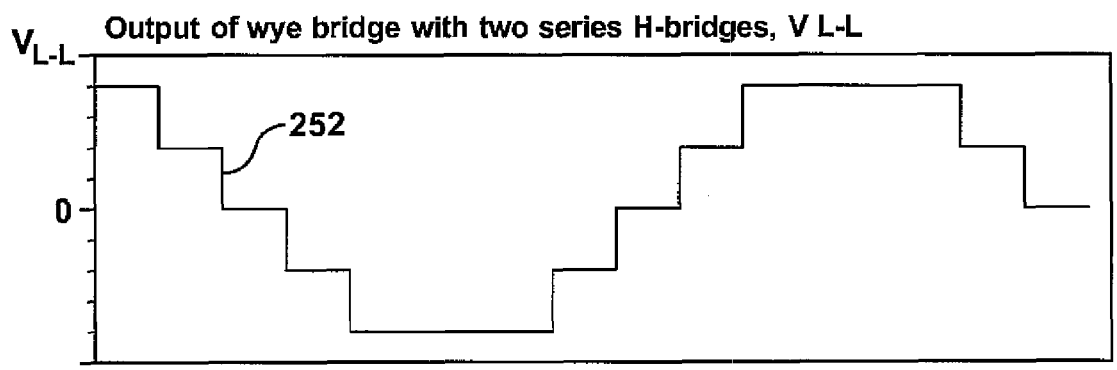
FIG. 2B illustrates stepped line-to-line voltage of two series H-bridges.
Figure 2C:
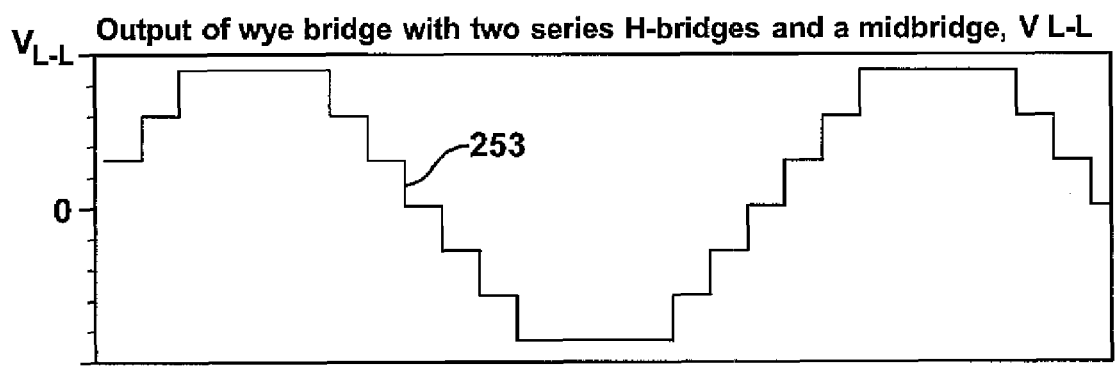
FIG. 2C illustrates 7-level stepped line-to-line voltage of two series H-bridges and a mid-bridge.

Several fundamental synchronous switching schemes for the three-phase wye-connected H-bridge converter may be considered with respect to the operation of large, high-speed electric motors (HSEM). The switching schemes establish a fundamental voltage output frequency for driving the motor. The switching output of one phase of the H-bridge (between the midpoints of the respective legs) may establish a positive step output, a negative step output and a zero-value output, known as a three-level output 251, as shown in FIG. 2A. However in the three-phase wye-connected configuration, the output phase voltage to output phase voltage (for example phase A to phase B) will provide a five-level output 252 due to the combination of steps from the H-bridge of phase A and the H-bridge of phase B, as illustrated in FIG. 2B. Higher number of levels of output voltage will more closely simulate a sinusoidal wave and reduce harmonic distortion to the motor. With the exemplary embodiment of the 7-level, wye-connected H-bridge converter of the present invention, not only are two H-bridge outputs (for example H-bridge output phase A and H-bridge output phase B) connected between line outputs, phase A and phase B of the converter, but the midpoints of the phase A leg and phase B leg of a mid-bridge are also in series between the line points, adding their voltage output contribution to provide a 7-level step line-to-line voltage 253. A representative 7-level step is illustrated in FIG. 2C.

One aspect of the present invention provides an exemplary embodiment for a converter with a three-phase output that provides including a four-bridge configuration for delivering a 7-level output during normal operation. The embodiment also provides for balanced operation of an ac-motor with a bridge disabled.

Figure 3A:
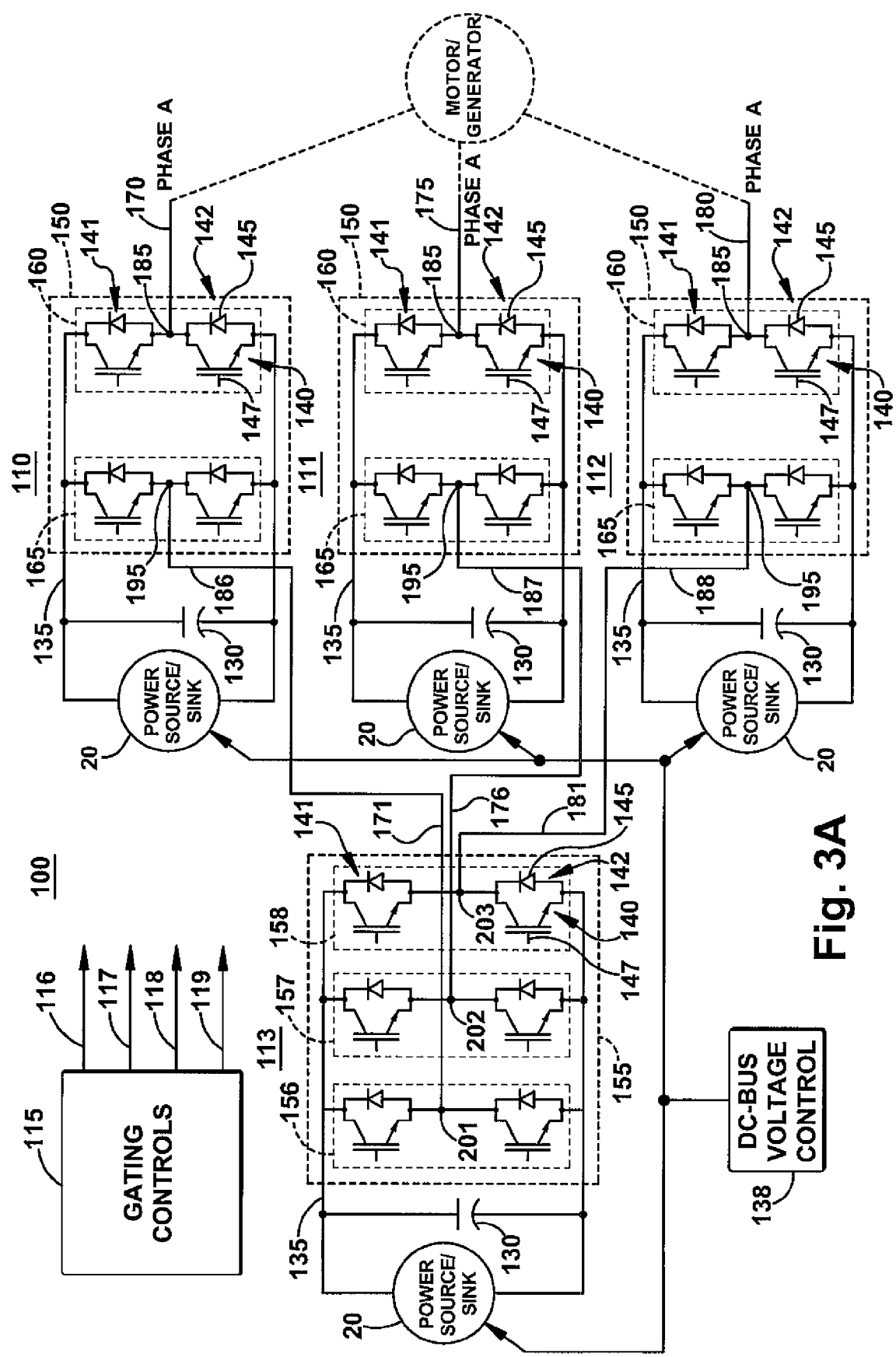
FIG. 3A illustrates a simplified embodiment of a 7-level, wye-connected H-bridge converter topology.

FIG. 3A illustrates a simplified embodiment of the 7-level, wye-connected H-bridge converter topology. The converter includes a plurality of H-bridges output phases 110, 111, 112. Each H-bridge output phase includes an H-bridge 150 with semiconductor switches (a representative semiconductor switch 140 with internal diode 145 and gating input 147). Each H-bridge includes an output leg 160 and a connecting leg 165. Each output leg 160 and connecting leg 165 includes an upper semiconductor switch 141 and a lower semiconductor switch 142 of the leg. A midpoint is located between the upper semiconductor switch and the lower semiconductor switch in each leg. The midpoints 185 of the output legs 160 provide phase outputs 170, 175, 180 for H-bridge output phases A 110, B 111 and C 112 of the converter 100. The midpoints 195 of the connecting legs 165 provide connecting outputs 186, 187, 188 to corresponding phase legs of a mid-bridge 113.

Each H-bridge output phase 110, 111, 112 also includes a power source/sink 20 with a dc power shaping circuit, represented by capacitor 30. The power source/sink/20 and dc power shaping circuit, represented by capacitor 30, establish a voltage on the dc-bus 135 that supplies the semiconductor switches 140 of the H-bridges 150.

The converter further includes the semiconductor mid-bridge phase 113. The mid-bridge phase 113 includes a power source/sink 20 with a dc power shaping circuit, represented by capacitor 30. The power source/sink/20 and dc power shaping circuit, represented by capacitor 30, establish voltage at dc-bus 135 for the semiconductor switches 140 of the mid-bridge 155. The mid-bridge phase 113 includes the three-phase semiconductor mid-bridge 155 with semiconductor switches (a representative semiconductor switch 140 with internal diode 145 and gating input 147). The three-phase semiconductor mid-bridge 155 includes three legs, leg 1 156, leg 2 157 and leg 3 158. Each of the three phase legs includes an upper semiconductor switch 141 and a lower semiconductor switch 142.

The midpoint of each leg provides an output. The midpoint 201 of phase A leg 156 may be tied to the connecting output 186 of H-bridge output phase A 110. The midpoint 202 of phase B leg 157 may be tied to the connecting output 187 of H-bridge output phase B 111. The midpoint 203 of phase C leg 158 may be tied to the connecting output 188 of H-bridge output phase C 112.

Insulated-gate bipolar transistors (IGBTs) 140 with built-in diodes 145 may form each leg of the H-bridges 150 and the mid-bridge 155, for example, but other power semiconductor switches such as integrated-gate commutated thyristors (IGCTs) or metal-oxide semiconductor field-effect transistors (MOSFETs) could be used instead. The type of power semiconductor switch is not important to the analysis.

A gating control 115 may provide gating signals 116, 117, 118 119 to the semiconductor devices 140 for the H-bridge output phases 110, 111, 112, and mid-bridge phase 113, respectively. The gating controls 115 may provide the gating signals 116, 117, 118 119 according to predetermined switching patterns. Gating controls may provide for synchronous switching of the semiconductor switches 140. The gating controls 115 may also provide synchronous switching patterns that include notches of designated width and designated position with respect to the zero-current crossing for converter line current. The gating controls for the bridges may be performed by a microprocessor, an integrated circuit, a field programmable gate array (FPGA) or other electronic circuits known in the art.

A dc-bus voltage control 138 may provide voltage control signals to the power source/sink 20 for individually setting the dc voltage on the dc-bus 135 for the H-bridge output phases 110, 111, 112 and the mid-bridge phase 113. The dc-bus voltage control 138 may provide alternate settings for voltage on the dc-bus 135 by contactor selection of alternate tap settings (not shown) on a power source/sink. Such alternate voltage settings may be provided by selection of multiple taps on isolated secondary winding of power supply transformers (not shown) or other methods known to the art.

Figure 3B:
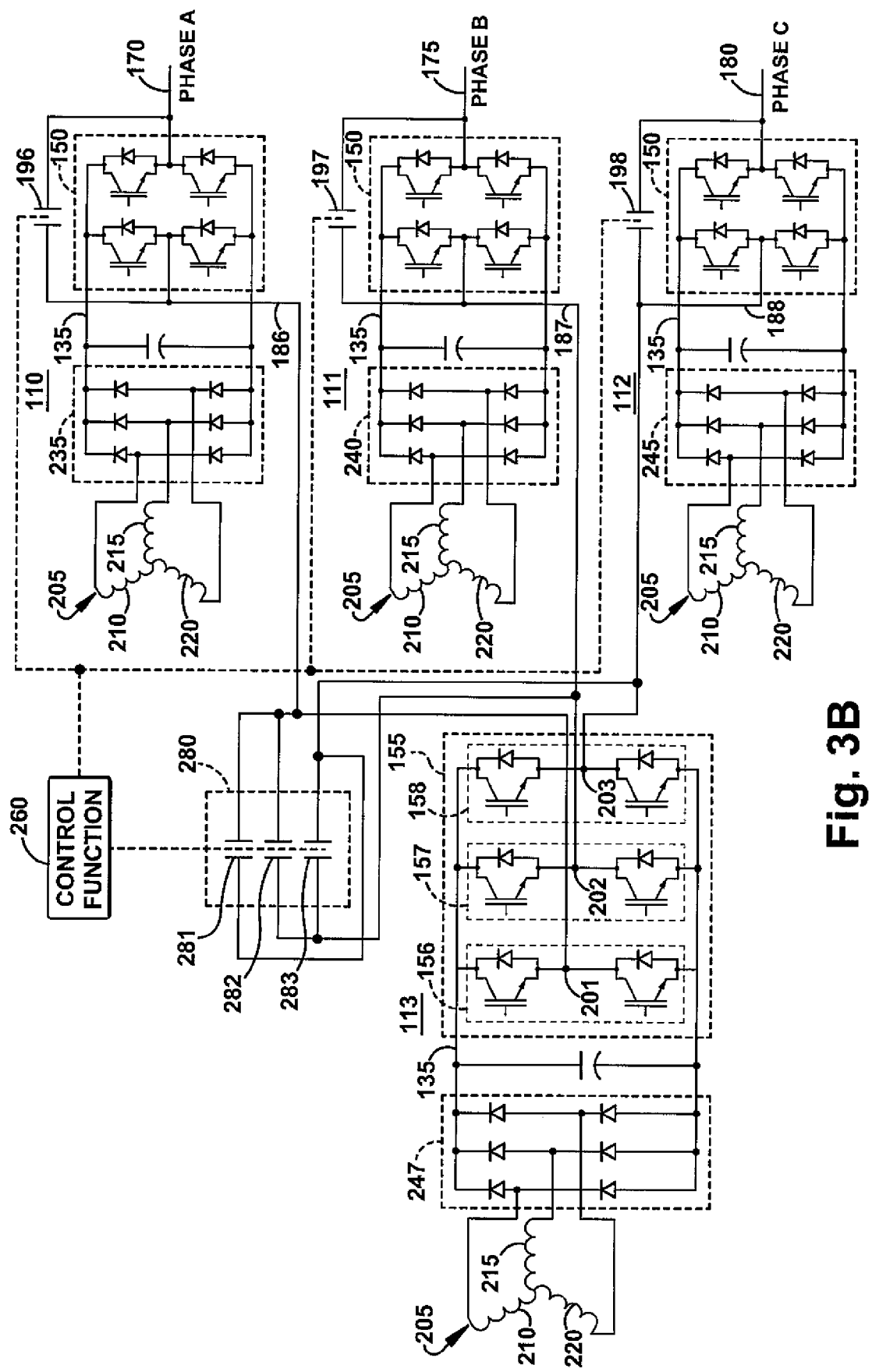
FIG. 3B illustrates a detailed representation for an embodiment of an inventive 7-level, wye-connected H-bridge converter topology with provision to operate after failure of any one bridge.

A more detailed arrangement of the 7-level wye-connected H-bridge converter topology is illustrated in FIG. 3B. Each bridge may be supplied by an isolated phase winding 210, 215, 220 for a phase from a transformer 205. The output of the transformer is rectified in a rectifier bank 247 and output to the dc-bus 135 for the bridge. The topology includes bypass contactors in circuit locations that permit it to be reconfigured to a 5-level wye-connected H-bridge in the event of a failure of any bridge.

More specifically, a H-bridge output phase bypass contactor may be provided around the semiconductor H-bridge between the connecting output of the connecting leg and the phase output of the output leg. Additionally, a mid-bridge bypass contactor may be provided. The mid-bridge bypass contactor includes a plurality of contacts that isolate a failed mid-bridge by creating a wye-connection among the connecting outputs for the three functioning H-bridges. Alternatively, contacts for the mid-bridge contactor may also function to connect the mid-bridge as a third H-bridge in place of a failed and bypassed H-bridge. In this case, the midpoint output from one phase leg of the mid-bridge is connected to the line output from the failed and bypassed H-bridge and a second midpoint output is wye-connected to the connecting output from the remaining two functioning H-bridges.

The mid-bridge contactor 280 includes contacts 281, 282 and 283. When contacts 281, 282 and 283 are all open, the connecting outputs 186, 187, 188 of H-bridge phase A 110, H-bridge phase B 111 and H-bridge phase C 112 respectively are connected to the midpoints 201, 202, 203 of the associated phase leg 156, 157, 158 of the mid-bridge 113.

When closed, contact 281 ties the connecting output 186 of H-bridge output phase A 111 and the midpoint 201 for phase A leg 156 of the mid-bridge 113 with the connecting output 188 of H-bridge phase C 112 and the midpoint 203 of phase C leg 158 of mid-bridge 113. When closed, contact 282 ties the connecting output 186 of H-bridge output phase A 110 and the midpoint 201 for phase A leg 1 156 of the mid-bridge 113 with the connecting output 187 of H-bridge output phase B 112 and the midpoint 202 of phase B leg of mid-bridge 113. When closed, contact 283 ties the connecting output 187 of H-bridge phase B 111 and the midpoint 202 for phase B leg 157 of the mid-bridge 113 with the connecting output 188 of H-bridge phase C 112 and the midpoint 203 for phase C leg 158 of mid-bridge 113.

Figure 4:
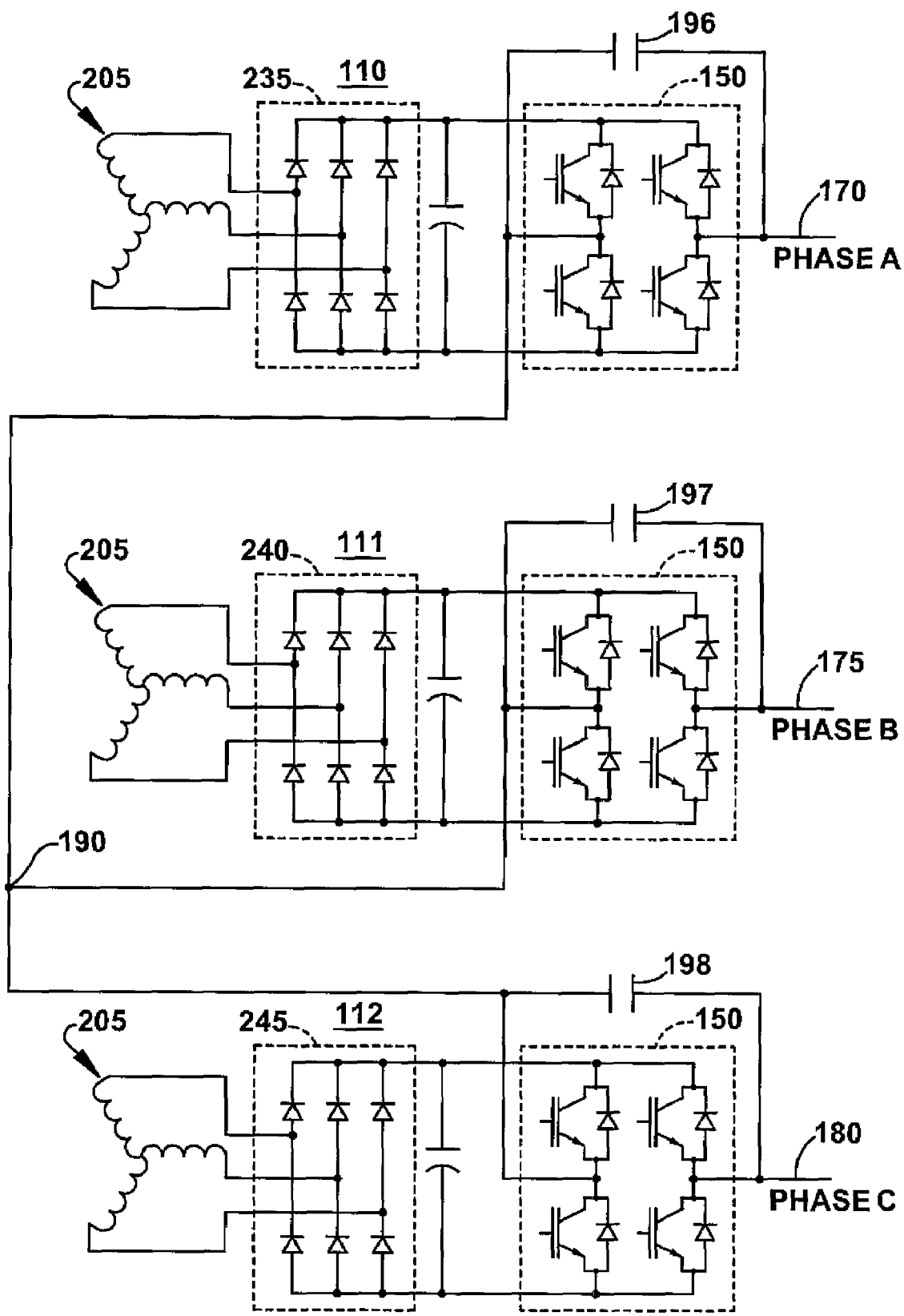
FIG. 4 illustrates an embodiment of an inventive 7-level wye-connected H-converter bridge reconfigured to a 5-level wye-connected H-bridge.

Closing mid-bridge bypass contact 281 and H-bridge bypass contact 197 bypasses the H-bridge output phase B 111 and makes mid-bridge 155 act as an H-bridge in a three-phase, wye-connected H-bridge configuration. Closing mid-bridge bypass contact 282 and H-bridge bypass contact 198 bypasses the H-bridge output phase C 113, making mid-bridge 155 act as an H-bridge in a three-phase, wye-connected H-bridge configuration. Closing mid-bridge bypass contact 283 and H-bridge bypass contact 196 bypasses the H-bridge output phase A 110, making mid-bridge 155 to act as an H-bridge in a three-phase, wye-connected H-bridge configuration. FIG. 4 illustrates an embodiment of the inventive 7-level wye-connected H-converter bridge reconfigured to a 5-level wye-connected H-bridge.

Figure 5A:
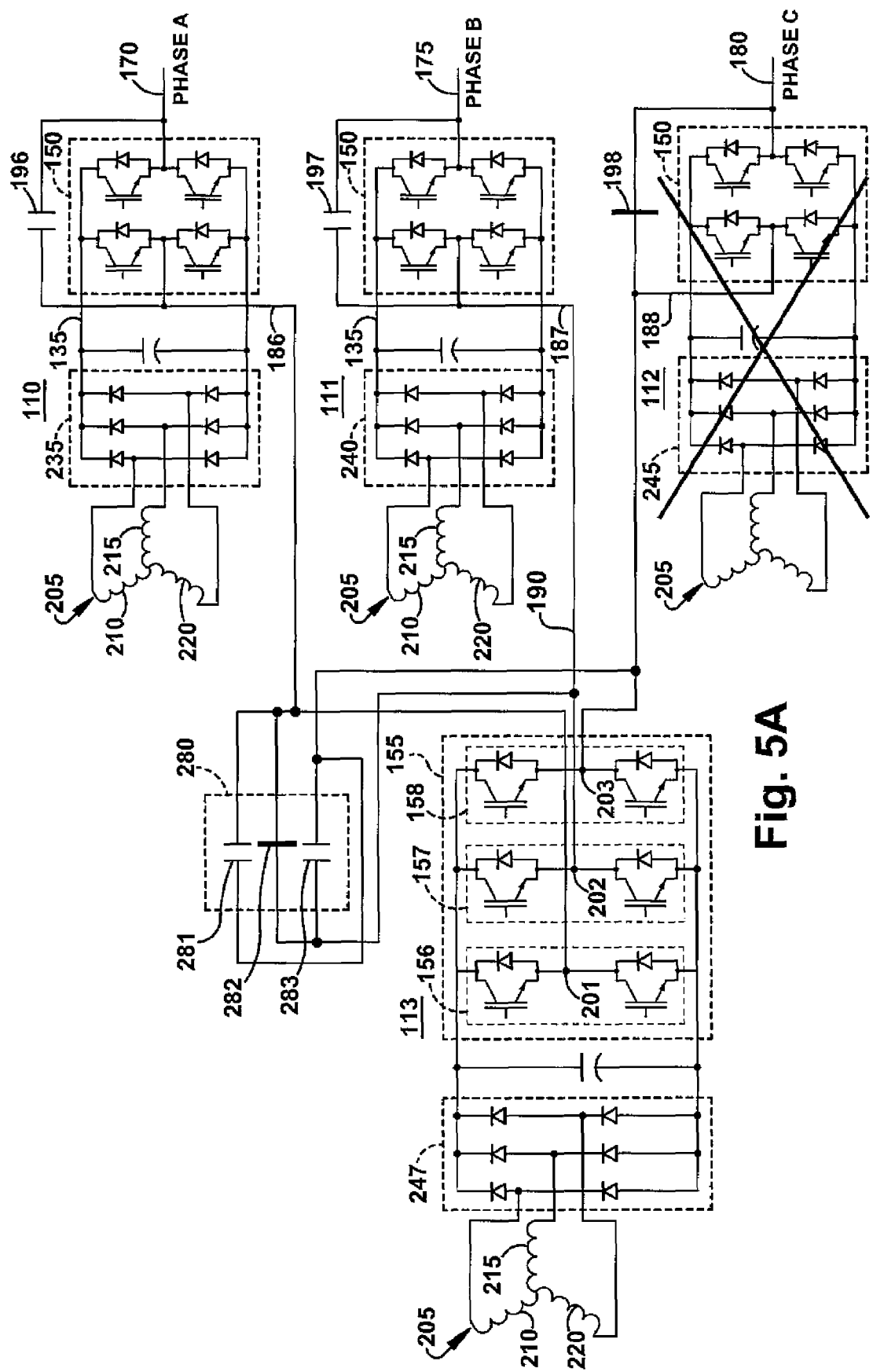
FIG. 5A illustrates an embodiment of an inventive 7-level wye-connected H-bridge converter reconfigured by bypassing a failed H-bridge output phase.
Figure 5B:
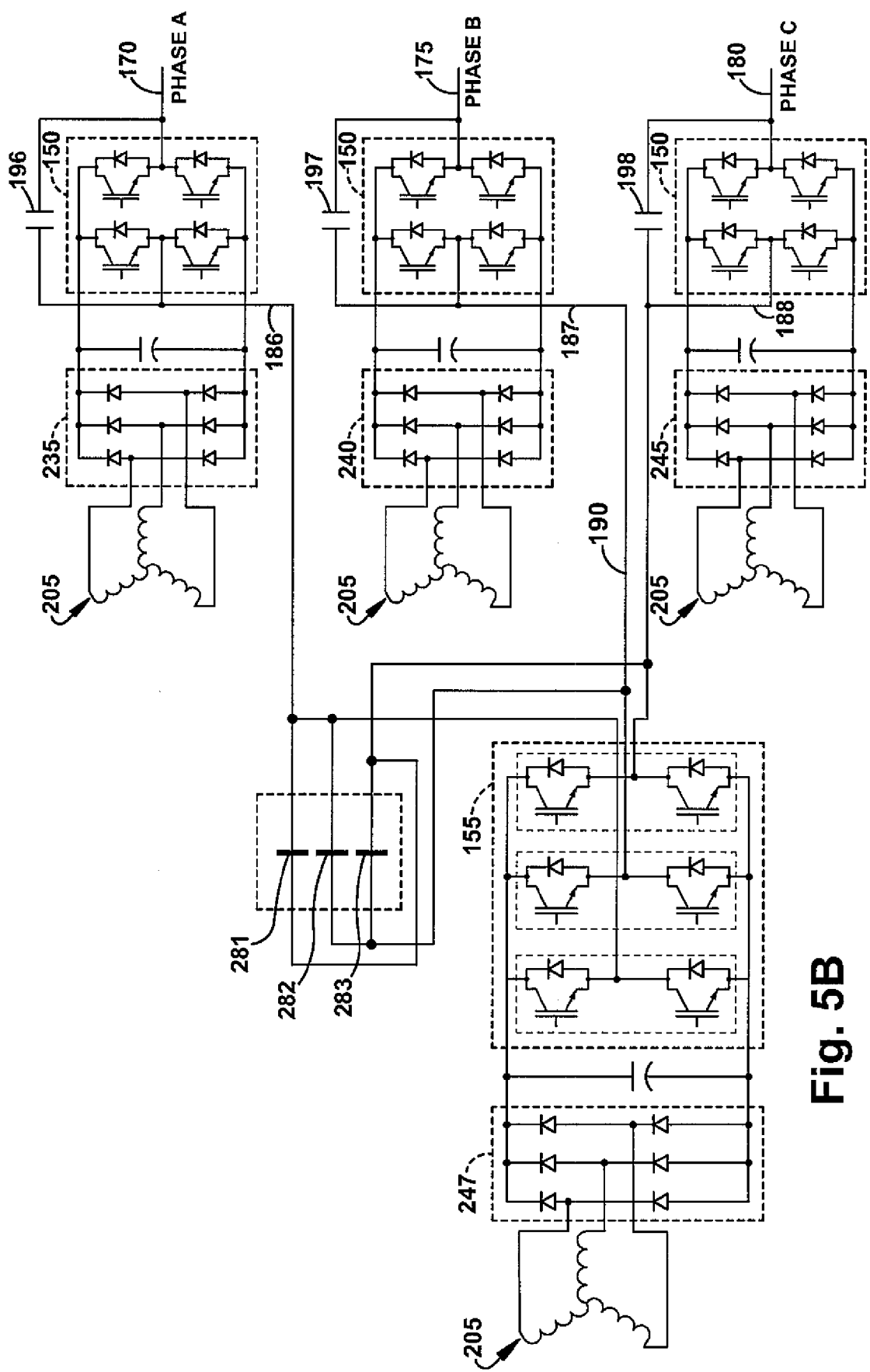
FIG. 5B illustrates an embodiment of an inventive 7-level wye-connected H-bridge converter reconfigured by bypassing a failed mid-bridge.

FIG. 5A illustrates an embodiment of an inventive 7-level wye-connected H-bridge converter reconfigured by bypassing a failed H-bridge output phase 112. FIG. 5B illustrates an embodiment of an inventive 7-level wye-connected H-bridge converter reconfigured by bypassing a failed mid-bridge. When contacts 281, 282, 283 are all closed, then the connecting outputs 186, 187, 188 for all H-bridge output phases 110, 111, 112 are connected in a wye-configuration, at wye point 190, effectively bypassing the mid-bridge phase 113.

As illustrated in FIG. 3B, a control function 260 controls the H-bridge output phase bypass contacts 196, 197, 198 and the mid-bridge bypass contactor 280. The control function 260 performs as follows employing solid-state contactors, mechanical contactors or other methods known in the art. The bypass contact for a H-bridge output phase is in a normal open state when the associated H-bridge output phase is functioning normally and is in a closed state when the H-bridge output phase is failed. The plurality of mid-bridge bypass contacts for the mid-bridge bypass contactor are in an open state when the mid-bridge is functioning normally and the plurality of H-bridge output phases are functioning normally. The plurality of mid-bridge bypass contactors are in a closed state when the mid-bridge is failed and the plurality of H-bridge output phases are functioning normally. One mid-bridge bypass contactor is associated with a failure of one H-bridge output phase and is in a closed state to connect the connecting output of one functioning H-bridge with the connecting output of another functioning H-bridge when an associated H-bridge fails.

In an exemplary embodiment of motor control, the converter is coupled with a 15 MW, 10,000 RPM, 333 Hz, with about a 6 KV line voltage. However, the invention should be considered applicable to other high speed electric motors (HSEMs) and ac-motors, in general. For example, the converter may also be considered for driving an 11 MW, 14,000 RPM, 467 Hz, with a line voltage of about 4 KV to about 6 KV, and a 6 MW, 17,000 RPM, 567 Hz, with a line voltage of about 4 KV to about 6 KV.

Referring again the inventive 7-level, wye-connected H-bridge converter of FIG. 3A, a power source/sink 20 is illustrated. It should be understood that the converter 100 is adaptable to absorb regenerative power from the motor load, the power being delivered through the converter to the power sink of power source/sink 20. Further, in place of the motor load, a generating source such as a generator may be provided. The converter 100 and converter control 115 are adaptable to transferring the generated ac power to the power source/sink 20.

Synchronous switching schemes with fixed pulse patterns and without notches may be applied to the semiconductor devices of the bridges for the converter. Notches may also be inserted around fundamental frequency pulses of the fixed pulse patterns to improve total harmonic distortion (THD) performance on the output line current of the converter. Higher effective switching rates due to the insertion of notches may incur higher switching losses on the semiconductor switches, putting the semiconductor switch closer to thermal margins and potentially impacting reliability of operation. However, positioning of the notches of the fixed pulse pattern for an individual bridge to be in close proximity to zero-current crossing of the output line current for the same individual bridge may limit the switching loss and at the same time achieve improved THD of the line current.

The application of two notches per cycle of the fundamental frequency of the switching pattern, wherein the notches are applied in proximity to the line current zero-crossing in a manner to optimize harmonic distortion and switching loss is referred to as a zero-current notch switching pattern with two notches (ZCnotch2). Further, the application of the ZCnotch2 switching pattern may be applied selectively to individual bridges of the converter. Such selective application may be based on applying the ZCnotch2 switching pulse pattern to individual bridges, which have sufficient thermal margin in semiconductor operation to tolerate somewhat higher switching losses in order to improve THD. For example, the semiconductor switches of the mid-bridge may be more thermally limiting than the semiconductor switches of the H-bridges. In this case, the ZCnotch2 switching pulse pattern may be applied to the semiconductor switches of the H-bridges, but synchronous switching pulse pattern without notches applied to the semiconductor switches of the mid-bridge.

The following analyses are performed using SABER. Power loss and temperature rise calculations assume: the IGCT is ABB 5SHX35L4511 with Eupec D1331 anti-parallel diode; cooling water temperature is 40 degrees C.; and the maximum junction temperature is limited to 115 degrees C.

Figure 6:
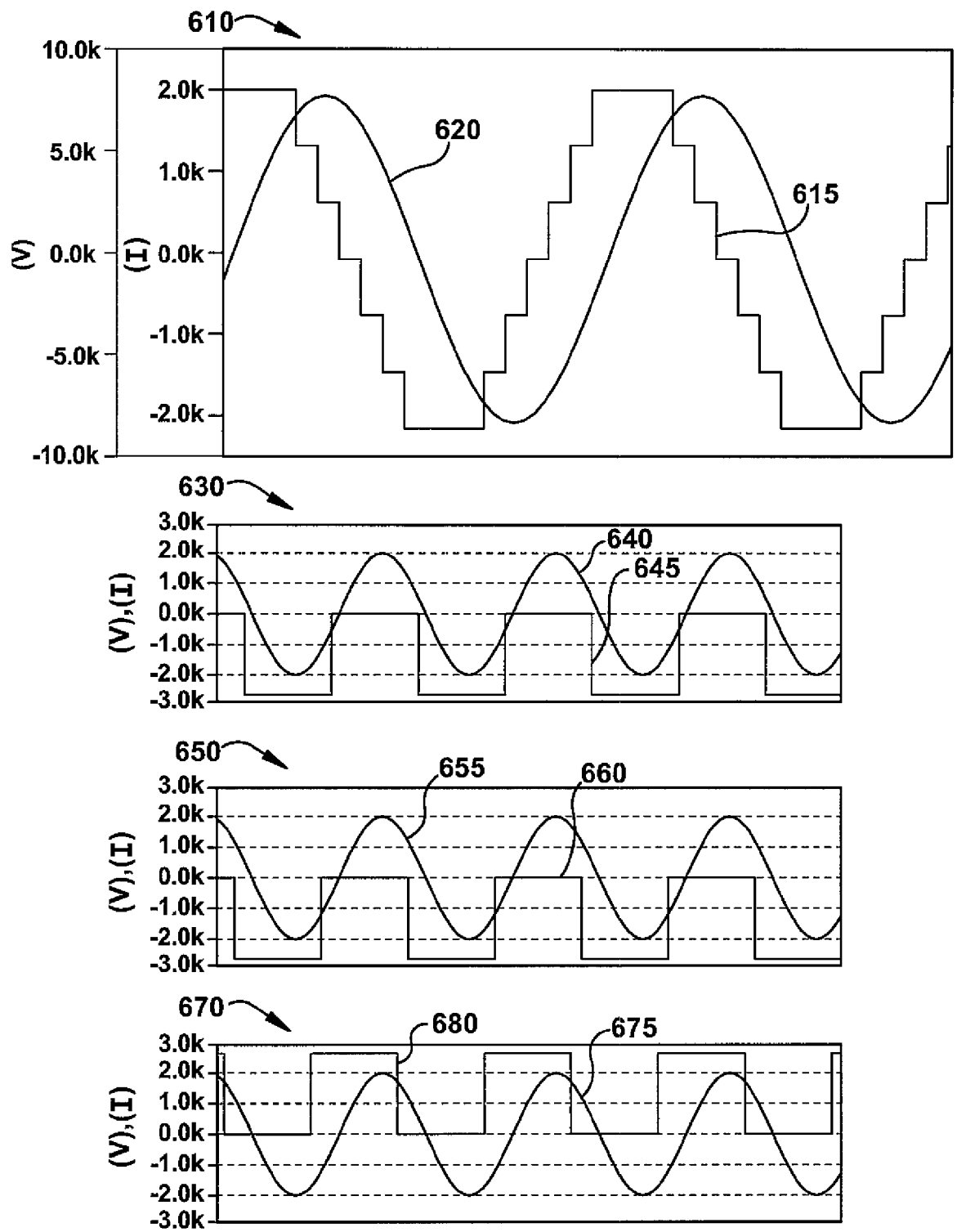
FIG. 6 illustrates voltage and current waveforms for an embodiment of an inventive 7-level wye-connected H-bridge converter operating with balanced dc-bus voltages to all bridges and a synchronous switching waveforms.

FIG. 6 illustrates graphs of optimum pulse positions for minimum voltage harmonic distortion in the output where the switching frequency equals the fundamental frequency (no notches), when the converter supplies a 6.2 KV line-to-line output voltage, a 1746 ARMS output current, and 15.0 MW output power. Balanced dc-bus voltages are applied to every bridge. Graph 610 illustrates the phase relationship between 7-level line-to-line output voltage 615 (voltage phase A to phase B) for the converter and line current 620 for phase A. Graph 630 illustrates the phase relationship (PF of 0.812) between line current 640 for phase A and a switching pattern 645 for H-bridge output leg phase A. Graph 650 illustrates the phase relationship (PF of 0.962) between line current for phase A and a switching pattern for H-bridge connecting leg phase A. The phase relationships are applicable for the line current of the other H-bridge phases and the related H-bridge phase A output leg and connecting leg. Graph 670 illustrates the phase relationship (PF of 0.519) between line current 675 for phase A and the switching pattern for the mid-bridge phase A leg. The switching pattern for the semiconductor switches of each phase are synchronous with the switched leg voltage for the respective phase. With four-bridges operating, the line current carried a total harmonic distortion of 2.00%. Other parameters for the operation in this configuration are provided in TABLE I. The limiting peak junction temperature for the semiconductors occurred in the mid-bridge, where the calculated temperature of 114.9 degree C. did not exceed the thermal limit of 115 degree C.

TABLE I

| Converter Parameters | Value | Units |
|---|---|---|
| Current Total Harmonic Distortion | 1.995 | % |
| Voltage Total Harmonic Distortion | 10.84 | % |
| H-Bridge Bus Voltage (For 6.2 KV L-L) | 2778.4 | VDC |
| PF in H-bridge leg 1 | 0.962 | |
| Peak Junction Temperature H bridge leg 1 | 92.6 | Degree C. |
| PF in H-bridge leg 2 | 0.812 | |
| Peak Junction Temperature H bridge leg 2 | 106.3 | Degree C. |
| Mid-bridge Bus Voltage (For 6.2 KV L-L) | 2778.4 | VDC |
| PF in mid-bridge | 0.519 | |
| Peak Junction Temperature in mid-bridge | 114.9 | Degree C. |
| MVA 1746A RMS | 18.75 | MVA |
| MW @ 0.8 PF | 15.00 | MW |

Further analysis was conducted to determine operating ability of the converter to operate with higher speed motors, under a condition of balanced (albeit reduced) dc bus voltage. Scaling power down and frequency up to meet other motor requirements, concludes satisfactory operation of the converter for the exemplary, 11 MW, 14,000 RPM, 467 Hz, with a line voltage down to about 4 KV with an output voltage of 4.525 KV line-to-line and an output current of 1754 ARMS. Operation for the exemplary 6 MW, 17,000 RPM, 567 Hz, with a line voltage of about 4 KV with an output current of 754 ARMS was also demonstrated.

The converter may also operate with reduced dc bus voltage provided to the mid-bridge. Reduced dc bus voltage will reduce switching loss on the mid-bridge, allowing the mid-bridge to deliver higher current at a lower voltage.

Figure 7:
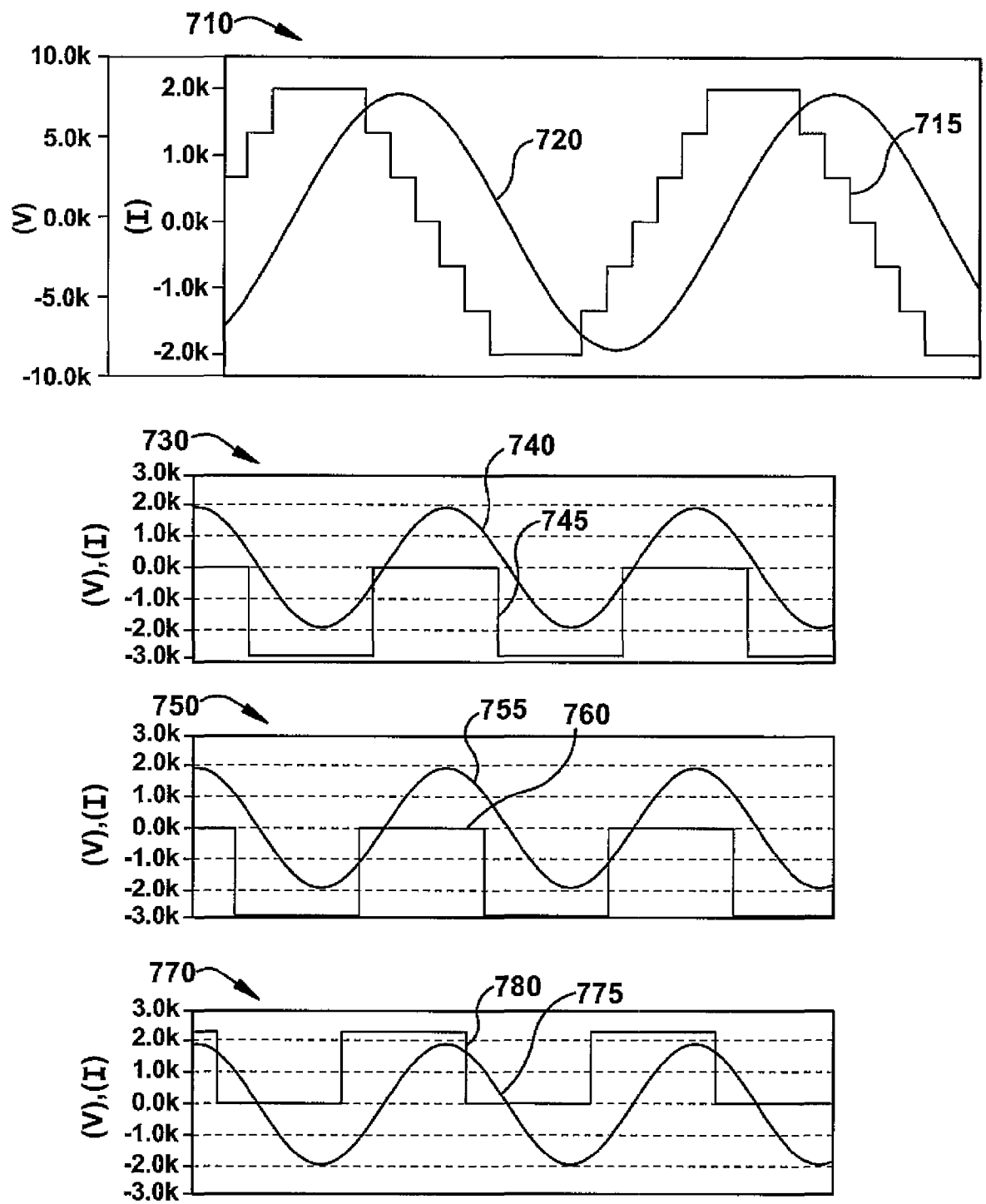
FIG. 7 illustrates voltage and current waveforms for an embodiment of an inventive 7-level wye-connected H-bridge converter operating with reduced dc-bus voltages to a mid-bridge and synchronous switching waveforms.

FIG. 7 illustrates optimum pulse positions for minimum voltage harmonic distortion in the output where the switching frequency equals the fundamental frequency (no notches), when the converter supplies a 6.2 KV line-to-line output voltage, a 1746 ARMS output current, and 15.0 MW output power. Balanced dc-bus voltages are applied to each H-bridge, but dc-bus voltage to the mid-bridge is reduced. Graph 710 illustrates the relationship between stepped lineto-line output voltage 710 (voltage phase A to phase B) for the converter and line current 715 for phase A. Graph 730 illustrates the phase relationship (PF of 0.812) between line current 740 for phase A and a switching pattern for 745 for H-bridge output leg phase A. Graph 750 illustrates the phase relationship (PF of 0.800) between line current 755 for phase A and switching pattern 760 for H-bridge connecting leg phase A. The phase relationships are applicable for the line current of phase A and phase B and the related H-bridge phase output leg and connecting leg. Graph 770 illustrates the phase relationship (PF of 0.509) between line current 775 for phase A and the switching pattern 780 for the mid-bridge. The switching pattern for the semiconductor switches of each phase are synchronous with the switched leg voltage for the respective phase. Reduced dc-bus voltage applied to the mid-bridge causes a smaller magnitude output voltage from the mid-bridge phase leg compared to the H-bridge phase leg voltage.

With all four-bridges operating, the line current carried a total harmonic distortion of 1.59%. Other parameters for the operation in this configuration are provided in TABLE II. The limiting peak junction temperature for the semiconductors now may occur in the leg 2 of the H-bridges, where the calculated temperature of 114.9 degree C. did not exceed the thermal limit of 115 degree C. Reduction of dc-bus voltage to the mid-bridge, allows the mid-bridge to put out more current without becoming thermally limiting, thereby increasing the allowable output of the converter.

TABLE II

| Converter Parameters | Value | Units |
| --- | --- | --- |
| Current Total Harmonic Distortion | 1.59 | % |
| Voltage Total Harmonic Distortion | 11.17 | % |
| H-Bridge Bus Voltage (For 5.852 KV L-L); 333 Hz | 2800 | VDC |
| PF in H-bridge leg 1 | 0.957 | |
| Peak Junction Temperature H bridge leg 1 | 100.4 | Degree C. |
| PF in H-bridge leg 2 | 0.800 | |
| Peak Junction Temperature H bridge leg 2 | 114.9 | Degree C. |
| Mid-bridge Bus Voltage (For 5.852 KV L-L) | 2778.4 | VDC |
| PF in mid-bridge | 0.509 | |
| Peak Junction Temperature in mid-bridge | 114.0 | Degree C. |
| MVA 1914A RMS | 19.40 | MVA |
| MW @ 0.8 PF | 15.52 | MW |

According to a further aspect of the present invention, a zero-current switching waveform is provided for the 7-level wye-connected H-bridge to power a large high-speed electric motor (HSEM). The switching waveform includes two notches per cycle on the switching waveform provided to each of the semiconductor switches. The switching waveform is referred to as a ZC (Zero Current) notch2 waveform.

According to the ZCnotch2 switching waveform, notches are placed at or near a line current zero crossing to minimize total harmonic distortion on the line current while at the same time minimizing switching loss and maximizing bridge output power capability. IGCT gate drive power may be reduced due to the low gate charge for switching events at low current, thereby improving the reliability of IGCT gate drive circuit.

The ZCnotch2 switching waveform makes the effective switching frequency equal to two times the fundamental frequency. The Zcnotch2 switching waveform may further be optimized to equalize power semiconductor losses between upper and lower devices in each leg of the H-bridge, thereby providing margin to operating limits. Further, the ZCnotch2 switching waveform utilized in H-bridge, retains the property that the output voltage at the output of every H-bridge is symmetrical, eliminating even harmonics.

The switching signals for the bridge may be controlled by a microprocessor, an integrated circuit, a field programmable gate array (FPGA) or other electronic circuits known in the art.

Saber analysis was performed to determine the optimized notch width and notch positioning under the exemplary voltage and current load conditions for the exemplary converter load. Total harmonic distortion for output current could be minimized by selecting choosing low harmonic outputs from combinations of notch width and notch positioning with the notch width within the range of approximately 0 degrees to 4.0 degree of width and positioned in the range of approximately 0 degrees to 40 degrees from the voltage zero. Further, while an exemplary 15 MW HSEM has been described in the analysis, application of the ZCnotch2 switching signal to HSEM with other ratings and ac electric motors, in general, is considered within the scope of the present invention.

Figure 8:
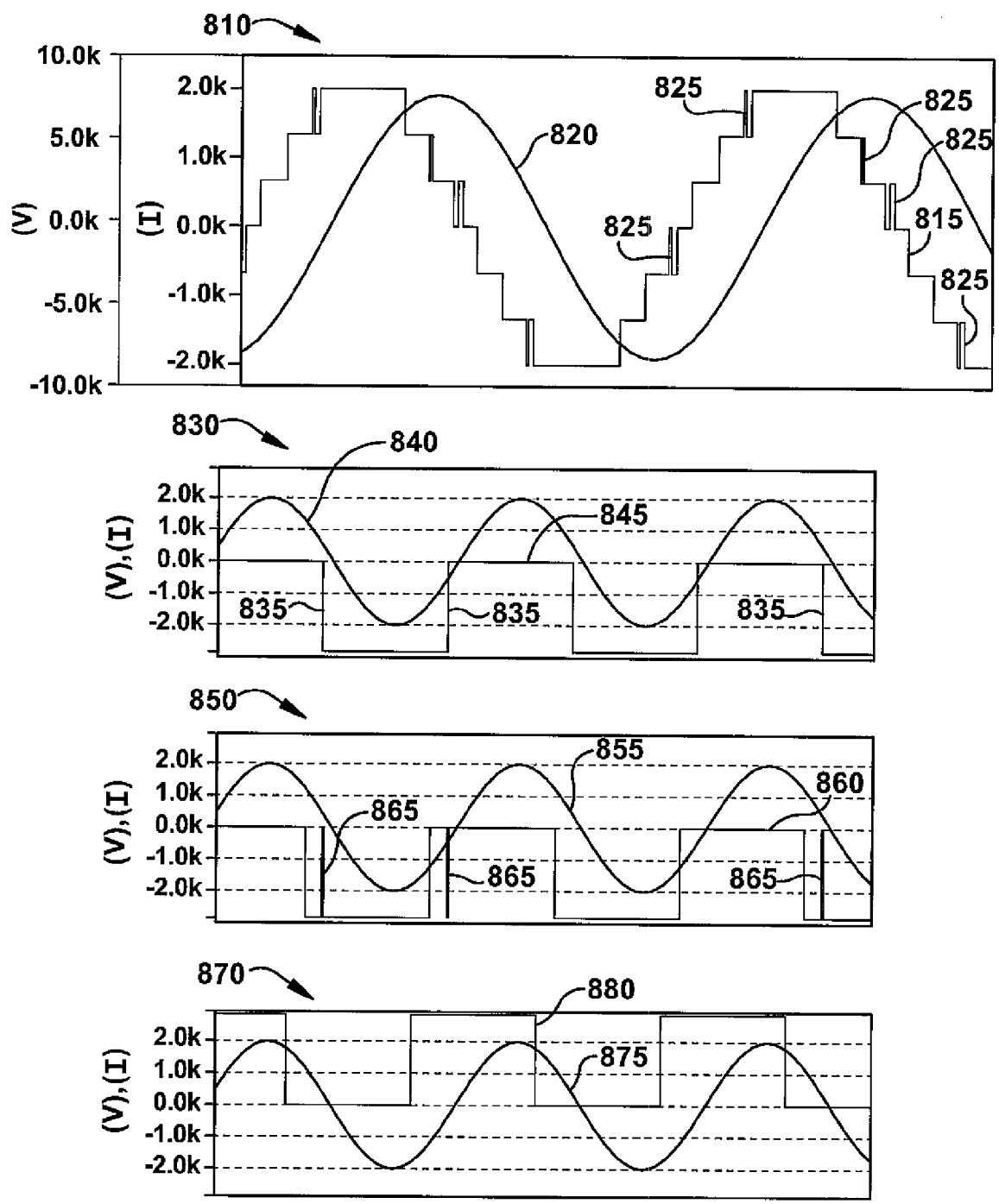
FIG. 8 illustrates voltage and current waveforms for an embodiment of an inventive 7-level wye-connected H-bridge converter operating with balanced dc-bus voltages to all bridges and a zero-current notch 2 switching waveform.

FIG. 8 illustrates graphs of optimum pulse and notch positions for minimum current harmonic distortion in the output where a synchronous switching pulse pattern with no notches is applied to the semiconductor switches of the mid-bridge and a zero-current switching pattern with two notches per cycle placed in proximity to zero-current crossing is applied to the semiconductor switches of the H-bridge output phases. The gating signals are applied from the gating controls 115 (FIG. 3A) when the converter supplies a 6.2 KV line-to-line output voltage, a 1746 ARMS output current, and 15.0 MW output power. Balanced dc-bus voltages are applied to every bridge.

Graph 810 illustrates the phase relationship between 7-level line-to-line output voltage 815 (voltage phase A to phase B) for the converter and line current 820 for phase A. ZCnotch2 notches, applied in the switching pulse pattern to the semiconductor switches for H-bridges, appear as multiple notches 825 in the line-to-line output voltage 815. Graph 830 illustrates the phase relationship (PF of 0.963) between line current 840 for phase A and the switching pattern 845 for H-bridge leg 1. ZCnotch2 notches applied in the switching pattern 845 to the semiconductor switches for H-bridge output leg phase A appear as multiple notches 835 in close proximity to the edge of the switching pulses. Graph 850 illustrates the phase relationship (PF of 0.796) between line current 855 for phase A and the switching pattern 860 for H-bridge connecting leg phase A. ZCnotch2 notches applied in the switching pattern 860 to the semiconductor switches for H-bridge output leg phase A appear as two notches 865 per cycle, offset from the edge of the switching pulses. Similar phase relationships are applicable for line current and H-bridge voltage for leg 1 and leg 2 in H-bridge output phases B and C. Graph 870 illustrates the phase relationship (PF of 0.519) between line current 875 for phase A and the synchronous switching pattern 880 for the mid-bridge phase legs. No notches are present in the voltage 880 because synchronous switching without notches is applied to the semiconductor switches for the phase legs of the mid-bridge. The switching pattern for the semiconductor switches of each phase are synchronous with the switched leg voltage (not shown) for the respective phase.

With four-bridges operating, the line current carried a total harmonic distortion of 0.87%. Other parameters for the operation in this configuration are provided in TABLE III. The limiting peak junction temperature for the semiconductors occurred in the mid-bridge, where the calculated temperature of 114.9 degree C. did not exceed the thermal limit of 115 degree C.

TABLE III

| Converter Parameters | Value | Units |
|---|---|---|
| Current Total Harmonic Distortion | 0.87 | % |
| Voltage Total Harmonic Distortion | 11.66 | % |
| H-Bridge Bus Voltage (For 5.852 KV L-L); 333 Hz | 2800 | VDC |
| PF in H-bridge leg 1 | 0.963 | |
| Peak Junction Temperature H bridge leg 1 | 95.5 | Degree C. |
| PF in H-bridge leg 2 | 0.796 | |
| Peak Junction Temperature H bridge leg 2 | 109.9 | Degree C. |
| Mid-bridge Bus Voltage (For 5.852 KV L-L) | 2800 | VDC |
| PF in mid-bridge | 0.496 | |
| Peak Junction Temperature in mid-bridge | 114.9 | Degree C. |
| MVA 1914A RMS | 18.76 | MVA |
| MW @ 0.8 PF | 15.0 | MW |

The THD for output current of the converter during normal four bridge operation is reduced to 0.87% using ZCnotch2 switching patterns applied to the semiconductor switches of the H-bridges, while maintaining balanced dc-bus voltage and power output.

While various embodiments are described herein, it will be appreciated from the specification that various combinations of elements, variations or improvements therein may be made, and are within the scope of the invention.

The invention claimed is:

1. A 7-level wye-connected H-bridge converter, the H-bridge converter comprising:
    a plurality of semiconductor H-bridge output phases, each H-bridge output phase including semiconductor switches; a power source/sink, a dc-bus, an output leg and a connecting leg, a phase output of the converter from a midpoint of each output H-bridge leg, and a connecting output from a midpoint of each connecting semiconductor H-bridge leg;
    a three-phase semiconductor mid-bridge, including semiconductor switches; a power source/sink, a dc-bus, and a phase output at a mid-point of each of a first leg, a second leg and a third leg of the mid-bridge;
    a connection between the connecting output of each individual H-bridge leg and a corresponding phase output from the midpoint of a first leg, a second leg and a third leg of the three-phase semiconductor mid-bridge; and
    a gating source for the semiconductor H-bridge and the three-phase semiconductor mid-bridge.

2. The 7-level wye-connected H-bridge converter according to claim 1, the H-bridge converter further comprising:
    a plurality of H-bridge bypass contacts, at least one H-bridge bypass contact being connected between the phase output and the connecting output for a respective H-bridge output phase;
    a plurality of mid-bridge bypass contacts, at least one mid-bridge bypass contact being connected between the connecting output of one H-bridge output phase and a connecting output of a different H-bridge output phase; and
    a control function for the H-bridge bypass contacts and the mid-bridge bypass contacts to isolate at least one of a failed H-bridge and a failed semiconductor mid-bridge.

3. The control function for the bypass contacts according to claim 2, wherein the control function comprises:
    the at least one bypass contact for a H-bridge output phase being in a normal open state when the associated H-bridge output phase is functioning normally and being in a closed state when the H-bridge output phase is failed;
    the plurality of mid-bridge bypass contacts being in an open state when the mid-bridge is functioning normally and the plurality of H-bridge output phases are functioning normally;
    the plurality of mid-bridge bypass contact being in a closed state when the mid-bridge is failed and the plurality of H-bridge output phases are functioning normally; and
    the at least one mid-bridge bypass contact being associated with a failure of one H-bridge output phase and being in a closed state to connect the connecting output of one functioning H-bridge with the connecting output of another functioning H-bridge when the associated H-bridge output phase fails.

4. The 7-level wye-connected H-bridge converter according to claim 3, semiconductor switches comprising:
    at least one of insulated-gate bipolar transistors, integrated gate-commutated thyristors and metal-oxide semiconductor field effect transistors.

5. The 7-level wye-connected H-bridge converter according to claim 3, the H-bridge converter further comprising:
    a dc-bus voltage control including balanced normal dc voltages provided to the dc-bus on the mid-bridge and the dc-bus on each of the H-bridge output phases for operation at rated load of the converter.

6. The 7-level wye-connected H-bridge converter according to claim 3, the H-bridge converter further comprising:
    a dc-bus voltage control including a normal dc-bus voltage provided to the dc-bus on each of the H-bridge output phases and a reduced dc voltage is provided to the dc-bus on the mid-bridge for operation at above rated load of the converter.

7. The 7-level wye-connected H-bridge converter according to claim 3, the H-bridge converter further comprising:
    a dc-bus voltage control including providing rated dc voltages for reduced operating frequency the converter to the dc-bus on each of the H-bridge output phases and below rated dc voltage for reduced operating frequency of the converter to the dc bus for the mid-bridge when the converter is operated to drive reduced frequency loads.

8. The 7-level wye-connected H-bridge converter according to claim 3, the gating source comprising:
    a synchronous switching pattern corresponding to a fundamental frequency of the converter output for the semiconductor switches of the H-bridges and the three-phase semiconductor mid-bridge.

9. The 7-level wye-connected H-bridge converter according to claim 3, the gating source further comprising:
    a zero current switching pattern with two notches, positioned in proximity to the zero crossing for line current, for the semiconductor switches of the H-bridges; and
    a synchronous switching pattern corresponding to a fundamental frequency of the converter output for the semiconductor switches of the mid-bridge.

10. The 7-level wye-connected H-bridge converter according to claim 3, the zero current switching pattern with two notches comprising:
    notches with a width over a range of 0.1 degree to approximately 4.0 degrees; and
    notches at an angle of approximately 0 degrees to approximately 40 degrees from a voltage zero.

11. A method for operating a 7-level wye-connected H-bridge converter including a plurality of semiconductor H-bridge output phases with semiconductor switches, each H-bridge output phase with a power source/sink, a dc-bus, an output leg and a connecting leg, a phase output of the converter from a midpoint of each output H-bridge leg, and a connecting output from a midpoint of each connecting semiconductor H-bridge leg; a three-phase semiconductor mid-bridge with semiconductor switches, including a power source/sink, a dc-bus, and a phase output at a mid-point of each of a first leg, a second leg and a third leg of the mid-bridge; a connection between the connecting output of each H-bridge leg and a corresponding phase output from the midpoint of a first leg, a second leg and a third leg of the three-phase semiconductor mid-bridge; and a gating source for the semiconductor H-bridge and the three-phase semiconductor mid-bridge; the method comprising:

operating with three functioning H-bridges and a functioning mid-bridge as a 7-level line-to-line output from the wye-connected H-bridge, each line-to-line output connected across the midpoint of the phase output and the connecting output of the respective H-bridge phase and between the midpoints of the corresponding legs of the mid-bridge output; and operating with a failed H-bridge as a 5-level output from a three-phase, wye-connected H-bridge; and operating with a failed mid-bridge as a 5-level output from a three-phase, wye-connected H-bridge.

12. The method for operating a 7-level wye-connected H-bridge converter according to claim 11, the step of operating with a failed H-bridge comprising:

bypassing a failed H-bridge output phase by closing a normally open H-bridge bypass contact; and tying the connecting outputs of the functioning H-bridges output phase by closing a normally-open mid-bridge bypass contact between the functioning H-bridge output phases.

13. The method for operating a 7-level wye-connected H-bridge converter according to claim 11, the step of operating with a failed mid-bridge comprising:

tying the connecting outputs of the functioning H-bridges into a wye-connection by closing normally open mid-bridge bypass contacts, each mid-bridge bypass contact between the connecting output of one H-bridge output phase and the connecting output of a different H-bridge output phase.

14. The method for operating a 7-level wye-connected H-bridge converter according to claim 11, the step of operating with three functioning H-bridges and a functioning mid-bridge comprising:

supplying balanced normal dc voltages to the dc-bus on the mid-bridge and the dc-bus on each of the H-bridge output phases for operation at rated load of the converter.

15. The method for operating a 7-level wye-connected H-bridge converter according to claim 11, the step of operating with three functioning H-bridges and a functioning mid-bridge comprising:

supplying a dc-bus voltage control including a normal dc-bus voltage provided to the dc-bus on each of the H-bridge output phases and a reduced dc voltage is provided to the dc-bus on the mid-bridge for operation at above rated load of the converter.

16. The method for operating a 7-level wye-connected H-bridge converter according to claim 11, the step of operating with three functioning H-bridges and a functioning mid-bridge comprising:

gating semiconductor switches of the mid-bridge and the H-bridge output phases according to a synchronous switching pattern.

17. The method for operating a 7-level wye-connected H-bridge converter according to claim 11, the step of operating with three functioning H-bridges and a functioning mid-bridge comprising:

gating semiconductor switches of the mid-bridge according to a synchronous switching pattern without notches; and gating semiconductor switches of the H-bridge output phases according to a zero current switching pattern with two notches positioned in proximity to the zero-crossing for line current; and minimizing total harmonic distortion for output line current.

18. The method for operating a 7-level wye-connected H-bridge converter according to claim 17, the step of minimizing total harmonic distortion for output line current comprising:

setting the notches with a width over a range of approximately 0.1 degree to approximately 4.0 degrees and
positioning the notches at an angle of approximately 0 degrees to approximately 40 degrees from a voltage zero.

19. A method for operating, with minimum harmonic distortion of output current, a 7-level wye-connected H-bridge converter including a plurality of semiconductor H-bridge output phases with semiconductor switches, each H-bridge output phase with a power source/sink, a dc-bus, an output leg and a connecting leg, a phase output of the converter from a midpoint of each output H-bridge leg, and a connecting output from a midpoint of each connecting semiconductor H-bridge leg; a three-phase semiconductor mid-bridge with semiconductor switches, including a power source/sink, a dc-bus, and a phase output at a mid-point of each of a first leg, a second leg and a third leg of the mid-bridge; a connection between the connecting output of each H-bridge leg and a corresponding phase output from the midpoint of a first leg, a second leg and a third leg of the three-phase semiconductor mid-bridge; and a gating source for the semiconductor H-bridge and the three-phase semiconductor mid-bridge; the method comprising:

gating semiconductor switches of the mid-bridge according to a synchronous switching pattern without notches; and gating semiconductor switches of the H-bridge output phases according to a zero current switching pattern with two notches positioned in proximity to the zero-crossing for line current.

20. The method for operating with minimum harmonic distortion of output current a 7-level wye-connected H-bridge according to claim 19; the step of gating according to a zero current switching pattern with two notches comprising:

setting notches with a width over a range of 0.1 degree to approximately 4.0 degrees; and
positioning the notches at an angle of approximately 0 degrees to approximately 40 degrees from a voltage zero.

* * * * *